(12) United States Patent
Hoppe et al.

(10) Patent No.: US 8,201,831 B2
(45) Date of Patent: Jun. 19, 2012

(54) SLIDING ELEMENT, IN PARTICULAR PISTON RING, METHOD FOR MANUFACTURING A SLIDING ELEMENT, SLIDING SYSTEM AND COATING FOR A SLIDING ELEMENT

(75) Inventors: Steffen Hoppe, Overath (DE); Manfred Fischer, Leichlingen (DE); Ralf Lammers, Wermelskirchen (DE); Manfred Muller, Burscheid (DE); Christiane Bauer, Burscheid (DE); Reiner Waller, Königswinter (DE); Jorg Vetter, Bergisch Gladbach (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 632 days.

(21) Appl. No.: 12/159,428

(22) PCT Filed: Nov. 30, 2006

(86) PCT No.: PCT/EP2006/011514
§ 371 (c)(1),
(2), (4) Date: Jun. 27, 2008

(87) PCT Pub. No.: WO2007/079834
PCT Pub. Date: Jul. 19, 2007

(65) Prior Publication Data
US 2009/0001669 A1 Jan. 1, 2009

(30) Foreign Application Priority Data
Dec. 30, 2005 (DE) .......................... 10 2005 063 123

(51) Int. Cl.
*F16J 9/26* (2006.01)

(52) U.S. Cl. .......................... 277/440; 277/443; 277/444
(58) Field of Classification Search .................. 277/440, 277/442–444
See application file for complete search history.

(56) References Cited

U.S. PATENT DOCUMENTS

| 6,139,022 | A | * | 10/2000 | Iwashita et al. | ............... 277/443 |
| 6,142,481 | A | * | 11/2000 | Iwashita et al. | ............... 277/443 |
| 6,228,471 | B1 | * | 5/2001 | Neerinck et al. | ............... 428/216 |
| 6,279,913 | B1 | | 8/2001 | Iwashita et al. | |
| 6,325,385 | B1 | * | 12/2001 | Iwashita et al. | ............... 277/442 |
| 2005/0100701 | A1 | | 5/2005 | Hamada et al. | |

FOREIGN PATENT DOCUMENTS

| DE | 19825860 A1 | 12/1999 |
| EP | 0905419 A2 | 3/1999 |
| EP | 1559808 A1 | 6/2005 |
| WO | WO2005/100810 A1 | 10/2005 |

* cited by examiner

*Primary Examiner* — Vishal Patel
(74) *Attorney, Agent, or Firm* — Robert L. Stearns; Dickinson Wright, PLLC

(57) ABSTRACT

A sliding element comprises at least one surface for sliding contact with a running face, wherein a wear layer and a run-in layer made from carbon are applied to the surface, and is characterized in that the run-in layer comprises hydrogen and nanocrystalline carbide phases. In a method for manufacturing a sliding element, the run-in layer is applied by means of a PVD process. A sliding system has an above-described sliding element and a body having a running face. A coating for a sliding element comprises a wear layer which can be applied to the upper side of the sliding element, and a run-in layer which is configured as a carbon layer, and is characterized in that the run-in layer comprises hydrogen and nanocrystalline carbide phases.

11 Claims, 1 Drawing Sheet

SLIDING ELEMENT, IN PARTICULAR PISTON RING, METHOD FOR MANUFACTURING A SLIDING ELEMENT, SLIDING SYSTEM AND COATING FOR A SLIDING ELEMENT

BACKGROUND OF THE INVENTION

1. Field of the Invention

The invention relates to a sliding element, in particular a piston ring, a method for manufacturing a sliding element, a sliding system and a coating for a sliding element.

Sliding elements, such as eg piston rings, comprise running faces with which they are in sliding contact with a partner in the tribosystem. Hereby, it is essential for the required service life to be achieved including under the sometimes extreme requirements. In the case of piston rings this relates to, for example, the increasingly high cylinder pressures, direct injection, exhaust gas recirculation and other features of modern engines which increasingly stress the piston rings. This is compounded by new types of cylinder materials and the objective of minimising oil consumption.

2. Prior Art

To achieve the service life, sliding elements of this kind comprise anti-wear layers. These can be applied by thermal spray methods, galvanic methods, by nitriding or the methods of thin-layer technology.

DE 198 25 860 A1 describes a piston ring with a coating of a diamond-like carbon on its running face. This layer forms a permanently effective wear layer.

U.S. Pat. Nos. 6,279,913 B1 and 6,325,385 B1 describe piston rings which comprise a DLC (diamond-like carbon) layer, wherein there can be a nitrided layer between this layer and the piston ring material.

US 2005/0100701 A1 relates to a piston ring with a hard carbon layer in which the hydrogen content varies over the thickness.

SUMMARY OF THE INVENTION

The invention is based on the object of providing a sliding element, in particular a piston ring which comprises not only good wear properties but also good operational reliability during the running-in phase. It is also intended to provide a method for manufacturing a sliding element of this kind, a sliding system with a sliding element of this kind and a coating for a sliding element.

The invention is based on the knowledge that, in addition to the need to provide good wear protection throughout the entire service life, the so-called running-in phase is particularly critical. It has been found that, during this running-in phase, the partners in the tribosystem have not yet sufficiently adjusted to each other and hence striation and/or scuff marks can result.

The solution according to the invention of combining good running-in properties with good wear properties for long-term operation is achieved in that the surface of the sliding element which is in sliding contact with a running face comprises a wear layer and, applied thereto, a run-in layer made of carbon comprising hydrogen and nanocrystalline carbide phases. The content of hydrogen can be, for example, 10 to 20 atom %. Under certain conditions, it is also possible to dispense with the nanocrystalline carbide phases. It has been found that the described combination of a run-in layer and wear layer is able to satisfy all requirements well. The run-in layer can be embodied as a DLC (diamond like carbon) layer and can be applied using the PVD method. As tests have shown, a layer of this kind is characterised by extremely high resistance to scuffing even in the event of high thermal and/or mechanical stress. Moreover, the run-in layer according to the invention has a low coefficient of friction which minimises the energy input into the partners in the tribosystem during the critical running-in phase. The nanocrystalline carbide phases also influence the wear resistance. In particular, the run-in layer according to the invention has a relatively low hardness, but excellent toughness. This facilitates a particularly quick adaptation of the partners in the tribosystem, in particular their typography.

In this context, the basic concept behind the invention further lies in the provision of two separate layers for the different requirements during the service life of a sliding element. As described, the run-in layer guarantees a quick adaptation of the partners in the tribosystem to each other so that the previous problems encountered during the running-in phase can be overcome. Hereby, it is accepted to a certain extent that the run-in layer cannot function as a permanent wear layer. The run-in layer will be eroded at least in regions and facilitates the rapid run-in of the sliding partners. The underlying wear layer then comes into effect for good wear properties during the required service life. The run-in layer can also be described as a cover layer of the wear layer.

The wear layer can for example be a thermal spray layer, a galvanic layer, a nitrided layer or a hard-material layer deposited using thin-layer technology. Wear-resistant layers of this kind guarantee the service life of the sliding element after the running-in phase. The former problems with wear-resistant layers of this kind during the running-in phase can be resolved by the separate run-in layer according to the invention. The inadequacies of said wear-resistant layers during the running-in phase consisted above all in the fact that scuff marks developed or the layers even failed under high thermal and/or mechanical stress. Although in the case of particularly hard layers, such as eg coatings applied by thin-layer technology, wear resistance was guaranteed, due to the high hardness, only insufficient adaptation of the partners in the tribosystem to each other is enabled. The partners can even be permanently damaged.

These problems were resolved by the run-in layer according to the invention which hereby guarantees problem-free running-in. As mentioned, permanent wear resistance can be ensured by the underlying wear layer.

Particularly good experiences have been obtained with a run-in layer according to the invention which is of the type Me-C:H. Layers of this type display particularly favourable running-in behaviour and high scuffing resistance. Thereby, particularly good results were obtained with a tungsten-containing layer. The ratio between carbon and tungsten is preferably greater than 1. In particular, the content of tungsten can be approximately 60% to 90% of the carbon content.

Preferably, the run-in layer comprises particles of the type WC and/or particles with contents of cobalt. The particles with cobalt contents can occur due to the fact that cobalt-bonded targets are used. The targets are the metal donors, for example tungsten-cobalt plates which are sputtered by ion bombardment during the PVD method for forming the run-in layer.

Tests have established as the preferred thickness of the run-in layer a thickness of 1 μm to 5 μm, in particular 3 μm to 5 μm. To assemble the run-in layer, according to the above-described embodiment, preferably a WC-layer with a thickness of for example 0.5 μm to 2 μm is formed in an inner region. In an outer region, the layer is of the type a-C:H:W and can additionally comprise nanocrystalline particles of the type WC and/or particles with contents of cobalt. The preferred thickness of the run-in layer of 1 μm to 5 μm includes the above-described inner WC layer with a thickness of for example 0.5 μm to 2 μm.

For the wear layer beneath the run-in layer, good results can be obtained with a nitrided layer, a galvanic layer, a thermal spray layer and a hard-material layer deposited in thin-layer technology. The nitrided layer can be embodied as a layer which grows into the steel or cast base material as a result of diffusion. A galvanic layer can advantageously be a hard chromium layer or a hard chromium layer with intercalation of hard materials. A thermal spray layer can be produced on the basis of molybdenum or mixtures of ceramic components.

In addition, the bond between the run-in layer and the wear layer can be improved by a preferably metallic intermediate layer, in particular a chromium layer.

For the basic body of the sliding element on which the described layers are formed, cast iron or steel has been found to be particularly favourable.

As mentioned, the sliding element according to the invention is preferably a piston ring, which comprises the run-in layer at least on the running face with which the piston ring is in sliding contact with a cylinder or a cylinder liner. In addition, the run-in layer can be embodied on one or both edges of the piston ring.

A method according to the invention for manufacturing the sliding element consists in applying the run-in layer by means of a PVD (physical vapour deposition) method. Thereby, during the start phase of the PVD method, arc-enhanced glow discharge (AEGD) may be used to perform ion bombardment of the sliding element to clean the surface. The PVD method can for example be performed at a deposition temperature of 200+/−30° C. Finally, it is mentioned that during the PVD method, tungsten-cobalt plates can be used as targets or metal donors which are sputtered by ion bombardment during the method The invention further relates to a sliding system with a sliding element in one of the above-described embodiments and a body with a running face.

For the running face, particularly good results can be achieved if it is made of an iron base alloy, in particular of grey cast iron, steel, an aluminium base alloy, aluminium-silicon materials, in particular a cast aluminium-silicon material, galvanic nickel or chromium-based materials, hypereutectic AlSi cast material, AlSi spraying material, in particular thermally sprayed AlSi spraying material and/or a thermal spray layer.

For a piston ring as the sliding element according to the invention, the sliding system correspondingly comprises a cylinder or a cylinder liner. The piston ring can thereby be inserted in a first groove of the piston, as a ring of the second groove, as a two-part oiling ring or as a steel band ring for three-part oiling rings.

The object named above is finally achieved by a coating for a sliding element comprising a wear layer and a run-in layer applied thereto. The preferred embodiments of this coating substantially correspond to the coatings of the preferred embodiments of the above-described sliding element and achieve the above-mentioned advantages.

BRIEF DESCRIPTION OF THE DRAWINGS

The invention is described in more detail in the following with reference to an example of an embodiment shown in the diagram.

The diagram is a schematic view of the structure of a surface of the sliding element according to the invention.

DESCRIPTION OF AN EMBODIMENT OF THE INVENTION

Figure 1:
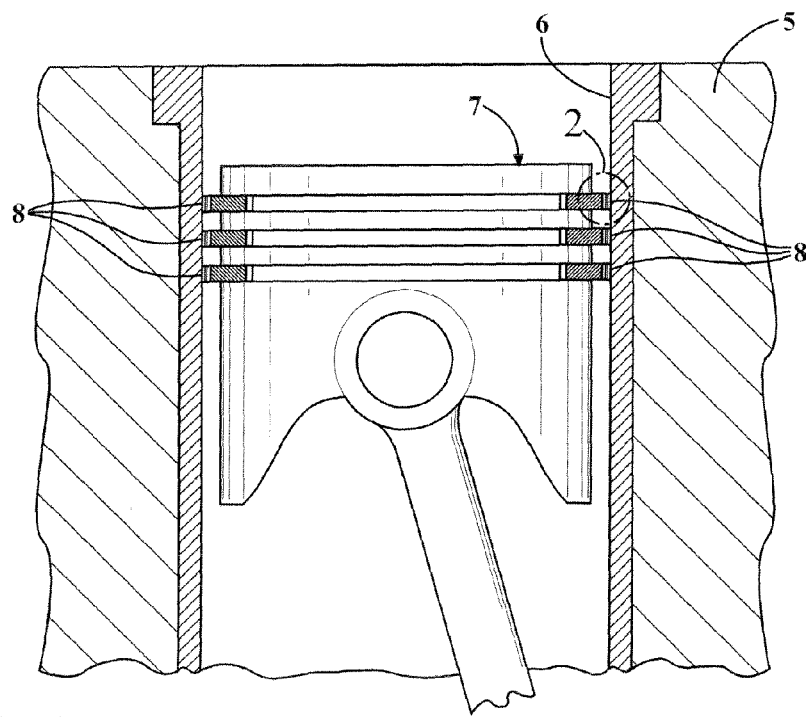
Figure 2:
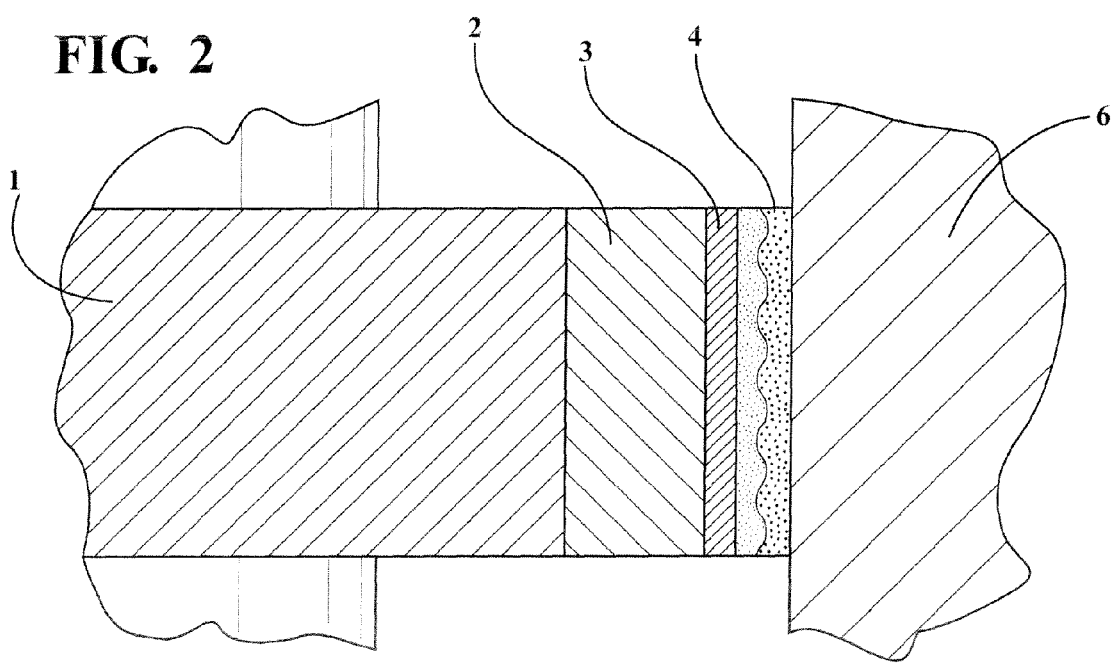

FIG. 1 is a cross-sectional side view of a cylinder 5 and cylinder liner 6 receiving a piston 7 including a sliding element 8, specifically a piston ring, which is in sliding contact with the cylinder liner 6. FIG. 2 is a schematic view of how a wear protection layer 2, a metallic primer coat 3 and a run-in layer 4 are formed on a base material 1 of the sliding element 8 of FIG. 1 "from inside to outside". In its initial condition, the run-in layer 4 forms the outermost layer and provides the above-described favourable running-in properties. During the running-in phase, the run-in layer 4 can be at least partially eroded so that subsequently the wear protection layer 2 takes effect to guarantee permanent wear resistance. FIG. 2 also shows the thickness ratios. The run-in layer 4 comprises for example a thickness of 1 μm to 5 μm. The metallic primer coat 3 is embodied with a significantly lower thickness. Finally, the wear layer 2 comprises a much greater thickness than the run-in layer 4.

The invention claimed is:

1. A piston ring comprising:
   a body with at least one running surface,
   a wear layer applied to the surface, the wear layer being selected from the group consisting of a nitrided layer, a galvanic layer, a thermal spray layer and a hard material layer separated in thin-layer technology,
   a run-in layer including an inner region applied to the wear layer and including WC, the thickness of the inner region of the run-in layer is 0.5 to 2 μm,
   the run-in layer including an outer region applied to the inner region and forming the outermost layer for sliding contact with a running face of a cylinder or cylinder liner,
   the outer region comprising a-C:H:W and at least one of nanocrystalline particles of WC and particles of cobalt,
   at least one of the inner region and the outer region comprising nanocrystalline carbide phases, and
   a metallic intermediate layer is provided between the inner region of the run-in layer and the wear layer.

2. A piston ring according to claim 1, wherein the thickness of the run-in layer is 1-5 μm.

3. A piston ring according to claim 1, including the body made of a material selected from the group consisting of cast iron and steel.

4. A piston ring according to claim 1, wherein the run-in layer is applied to at least one of a running face of the piston ring and the edges of the piston ring.

5. A piston ring according to claim 1, wherein the run-in layer comprises a physical vapour deposition (PVD) layer.

6. A sliding system comprising a piston and the piston ring according to claim 1 including the body with the running surface.

7. A sliding system according to claim 6, wherein the running surface is made of a material selected from the group consisting of: grey cast iron, steel, an aluminium base alloy, an aluminium-silicon material, an aluminium-silicon cast material, of galvanic nickel- or chrome-based material, of hypereutectic AlSi cast material, of an AlSi thermally sprayed AlSi spraying material and a thermal spray layer.

8. A sliding system according to claim 6 including at least one of a cylinder and a the cylinder liner, and wherein the piston ring is inserted in a groove of the piston.

9. A piston ring according to claim 2, wherein the thickness of the run-in layer is 3-5 μm.

10. A piston ring according to claim 1, wherein the metallic intermediate layer comprises a chromium layer.

11. A sliding system according to claim 6 including at least one of a cylinder and a cylinder liner, and wherein the piston ring is selected from the group consisting of a ring of a two-part oiling ring and a steel band ring of a three-part oiling ring.

* * * * *